United States Patent

Gamo et al.

[11] 4,195,989
[45] Apr. 1, 1980

[54] HYDROGEN STORAGE MATERIAL

[75] Inventors: Takaharu Gamō, Fujiidera; Yoshio Moriwaki, Hirakata; Toshio Yamashita, Katano; Masataro Fukuda, Toyonaka, all of Japan

[73] Assignee: Matsushita Electric Industrial Co., Ltd., Kadoma, Japan

[21] Appl. No.: 954,619

[22] Filed: Oct. 25, 1978

[30] Foreign Application Priority Data

Oct. 28, 1977 [JP] Japan .................. 52-130049
Apr. 14, 1978 [JP] Japan .................. 53-44677

[51] Int. Cl.$^2$ ........................... C22C 22/00
[52] U.S. Cl. ................. 75/175.5; 75/134 F; 75/134 M; 75/134 V; 148/32; 423/644
[58] Field of Search .......... 423/644, 648 R; 75/175.5, 134 M, 134 F, 134 V; 148/32

[56] References Cited

U.S. PATENT DOCUMENTS

| | | | |
|---|---|---|---|
| 3,922,872 | 12/1975 | Reilly et al. ............... | 75/175.5 |
| 4,069,303 | 1/1978 | Yamadaya et al. ........... | 75/134 M |
| 4,079,523 | 3/1978 | Sandrock ................. | 423/644 |

*Primary Examiner*—L. Dewayne Rutledge
*Assistant Examiner*—Peter K. Skiff
*Attorney, Agent, or Firm*—Wenderoth, Lind & Ponack

[57] ABSTRACT

The disclosure relates to a hydrogen storage material composed of a Ti-Mn-M alloy in which M represents at least one metal selected from the group consisting of vanadium, chromium, iron, cobalt, nickel, copper and molybdenum, and which defines an alloy phase of a Laves phase having a hexagonal crystal structure of $MgZn_2(C_{14})$ type and crystal lattice parameters $a=4.86\sim4.90$Å and $C=7.95\sim8.02$Å. The hydrogen storage material is economical and suited to practical purposes, since it readily absorbs a large amount of hydrogen at room temperature and reversibly discharges a large amount of hydrogen with safety through variations of ambient hydrogen pressure, temperature conditions or electro-chemical conditions.

7 Claims, 7 Drawing Figures

HYDROGEN STORAGE MATERIAL

BACKGROUND OF THE INVENTION

The present invention relates to material for storage, preservation and transportation of hydrogen. More particularly, the present invention relates to a hydrogen storage metallic material suited to practical use which is composed of a Ti-Mn-M alloy (of which M is at least one metal selected from the group consisting of vanadium, chromium, iron, cobalt, nickel, copper and molybdenum (referred to as V, Cr, Fe, Co, Ni, Cu and Mo respectively hereinbelow)) and capable of storing hydrogen at high density and with safety, and also relates to a method of producing a Ti-Mn-Fe alloy which is one of said hydrogen storage materials.

Conventionally, for storing or transporting hydrogen, it has been a general practice either to employ pressure vessels in which hydrogen is compressed under high pressure or to maintain hydrogen at an extremely low temperature in the form of liquid hydrogen. Both of the above described methods, however, not only require special vessels for this purpose, but in the former method, the hydrogen storage amount per unit volume of the vessel is very small, since the hydrogen density is low even when the hydrogen is highly compressed under 100 atmospheric pressure, while in the latter method, perfect preventive measures must be taken against evaporation of the liquid hydrogen due to external heat. Therefore, both of the known methods as described above necessitate extremely large-sized storing units, with consequent inconveniences in transportation and carrying about of the storing units, thus not being suitable for applying thereto generally demanded compact storing units with desirable transportability.

On the other hand, there has also conventionally been proposed another method in which hydrogen is caused to be absorbed in certain metals or alloys for storing, and also to be released or desorbed therefrom during use of the hydrogen. Attention has recently been directed to the method as described above for hydrogen storage, particularly due to the fact that the hydrogen absorption amount per unit volume of these metals or alloys are sufficiently large. The reaction involved in the above case is a solid-gas reaction with a heat generation of $-\Delta H_f$ (kcal/mole $H_2$) as represented by the following equation.

$$(2/n)M(\text{solid}) + H_2(\text{gas}) \rightleftharpoons (2/n)MH_n(\text{solid}) - \Delta H_f$$

The metals or alloys which are of solids are capable of retaining hydrogen at high density by forming metal hydrides through absorption of hydrogen under a hydrogen atmosphere having specific temperatures and pressures respectively or under electro-chemical conditions, and by further changing the temperatures or pressure conditions or electro-chemical conditions, it is possible to cause the absorbed hydrogen to be reversibly released or desorbed. Metal hydrides ($MH_n$) in which hydrogen has entered the crystal lattice of the metal for being combined therewith is capable of storing hydrogen at a density approximately equal to that of the liquid hydrogen, with hydrogen retained in the state of solid, and thus, have properties satisfactory for actual use in the releasing of hydrogen, control of speed for accumulation of hydrogen and methods for effecting releasing and control. Accordingly, if these metal hydrides to be employed for the purpose are low in cost from the viewpoint of actual use, they may take the place of the conventional systems utilizing gas cylinders or liquid hydrogen system, with extreme safety owing to their solid state, while being advantageous from the point that it is possible to store hydrogen for a long period of time.

Several kinds of these metals or alloys having various advantages for hydrogen storage have already been proposed in the past, among which attenuation has been drawn to Mg, Mg-Ni or Mg-Cu alloys, R-Ni or R-Co alloys (wherein R is rare earth elements), Ti-Fe alloys, etc. for their comparative superiority for application to actual use.

The known metals or alloys as described above, however, still have some disadvantages for use as practical hydrogen storage materials. For example, although Mg, Mg-Ni, and Mg-Cu alloys have comparatively large hydrogen absorption amounts per unit weight, the absorption and desorption or releasing of hydrogen must be effected at temperatures higher than 250° C. On the contrary, in R-Ni or R-Co alloys and Ti-Fe alloys, it is possible to absorb or desorb hydrogen at normal temperatures, but these R-Ni and R-Co alloys are expensive with small hydrogen absorbing capacity per unit weight of metal, while Ti-Fe alloy requires high temperature and high pressure conditions in the hydriding at the initial stage, and has further disadvantages, for example, in that the reactions for hydrogen absorption and desorption are comparatively slow, and that the hydrogen dissociation pressure-hydriding composition isothermic curves are formed into two stages.

SUMMARY OF THE INVENTION

Accordingly, an essential object of the present invention is to provide material for storage, preservation and transportation of hydrogen in which the operations required for absorbing and releasing hydrogen are extremely facilitated, while the hydrogen absorbing amount and releasing amount per unit weight are sufficiently increased, with substantial elimination of the disadvantages inherent in the conventional hydrogen storage materials.

Another important object of the present invention is to provide material for storage, preservation and transportation of hydrogen as described above which is remarkably superior in various properties and characteristics for actual use, and can be manufactured on a large scale at low cost.

A further object of the present invention is to provide a method of manufacturing the hydrogen storage, preservation and transportation material of the above described type which is simple as compared with conventional processes, with consequent reduction in manufacturing cost and in the deviation of properties between manufacturing lots.

In accomplishing these and other objects, according to one preferred embodiment of the present invention, there is disclosed a metallic material for storage of hydrogen which comprises a substance able to store hydrogen and composed of a Ti-Mn-M alloy defining an alloy phase which is substantially a Laves phase constituted by an intermetallic compound, which has a hexagonal crystal structure of the $MgZn_2(C_{14})$ type, and crystal structure parameters a and c which have values in the ranges, $a = 4.86 \sim 4.90$ Å and $c = 7.95 \sim 8.02$ Å. M of the above Ti-Mn-M alloy represents at least one kind of metal selected from the group consisting of vanadium, chromium, iron, cobalt, nickel, copper and molybdenum, while the Ti-Mn-M alloy is prepared through synthesization by homogeneously melting at least ferrotitanium and manganese as raw material in an atmosphere of inert gas. The alloy thus formed is further subject to hydriding through absorption of hydrogen thereinto. By the above alloy according to the present invention, the material for storing, preserving and transporting hydrogen in which the absorption and releasing of hydrogen is markedly facilitated is presented, with increased hydrogen absorption and releasing amounts.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

In the first place, it is to be noted that, according to the hydrogen storage material of the present invention, various properties of the material for hydrogen storage have been improved, with facilitation of manufacturing procedures of alloy by further addition of metal or an alloy represented by M to a Ti-Mn binary alloy previously proposed by the present inventors, for example, in U.S. Pat. application Ser. No. 760,421 now U.S. Pat. No. 4,153,484, assigned to the same assignee.

The hydrogen storage material according to the present invention is an alloy represented by a general equation Ti-Mn-M, wherein M is at least one kind of metal selected from the group consisting of V, Cr, Fe, Co, Ni, Cu and Mo. In the Ti-Mn-M alloy as described above, the alloy phase effective for the hydrogen storage metallic material is the Laves phase of $MgZn_2$ type($C_{14}$). It should be noted here, however, that in the Ti-Mn-M alloy, the alloy phases other than $MgZn_2$ type Laves phase or mixture of the alloy phases other than $MgZn_2$ type laves phase and $MgZn_2$ type Laves phase are unable to provide properties practical as hydrogen storage material. Furthermore, in the Ti-Mn-M alloy, in addition to the precondition that the alloy is of a $MgZn_2$ type Laves phase, it is necessary to control, through variation of the alloy composition, so as to bring the values of the crystal lattice parameters of the alloy phase into a suitable range, since the properties as the hydrogen storage material are closely related to the crystal lattice parameters of the $Mg_nZn_2$ type Laves phase. In the case of the Ti-Mn-M alloy, it is essential that the optimum crystal lattice parameters superior in the properties as the hydrogen storage material should have values in the range a=4.86~4.90 Å and c=7.95~8.02 Å.

Figure 1:
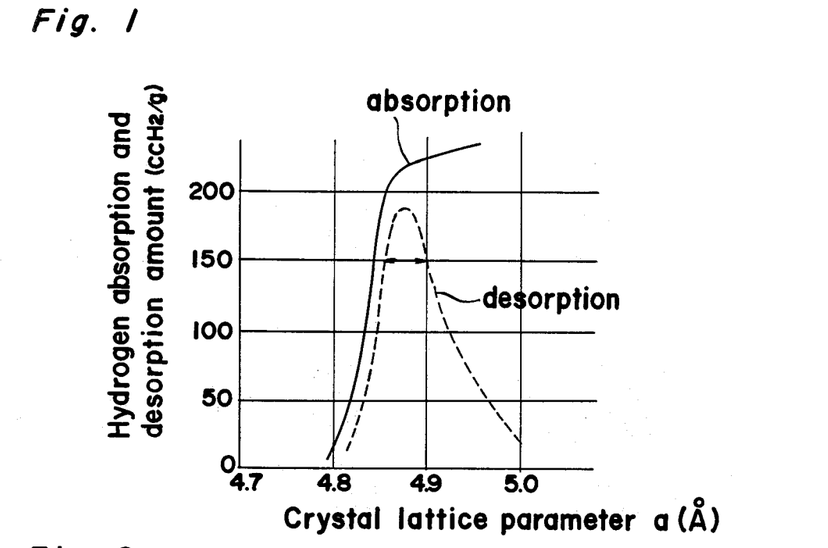
FIGS. 1 and 2 are graphs illustrating the relation between crystal lattice parameters of Ti-Mn-M alloy of the invention and the properties of the alloy as the hydrogen storage material, especially hydrogen absorption and releasing or desorption amounts.
Figure 2:
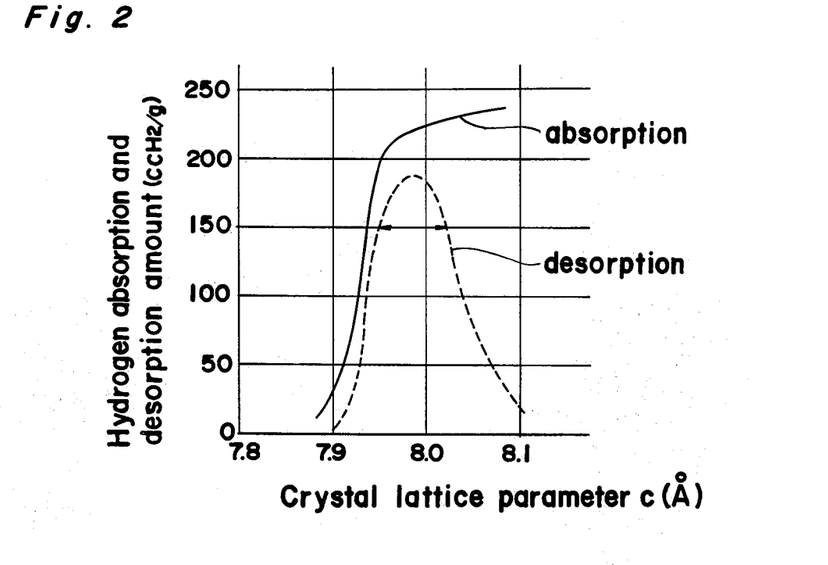

Referring now to the drawings, there are shown in the graphs of FIGS. 1 and 2, the average relation between the crystal lattice parameters of the Ti-Mn-M alloy and properties thereof as the hydrogen storage material, especially the hydrogen absorption and desorption amounts. In FIGS. 1 and 2, the hydrogen absorption and desorption amounts per 1g($ccH_2$/g) of the alloy at a temperature of 25° C. are taken on the ordinate, while the crystal lattice parameters a(Å) or c(Å) is taken on the abscissa for illustrating the relations therebetween. In the graphs of FIGS. 1 and 2, it is so arranged that during variation of one crystal lattice parameter, the other crystal lattice parameter is in the range of the present invention. From FIGS. 1 and 2, it is noticed that the amount of hydrogen absorption tends to show a favorable trend when the crystal lattice parameters have large values, while a hydrogen desorption amount shows the maximum value at particular values of the crystal lattice parameters and tends to decrease when the values of the crystal lattice parameters fall below or exceed such particular values. From the viewpoint of practical application, it is considered necessary that the amount of hydrogen absorption for the hydrogen storage material is of values higher than 150 $ccH_2$ per 1 g of alloy at room temperature, and in the case of the alloy according to the present invention, it is seen from the graphs that the optimum crystal lattice parameter a having the hydrogen absorption amount higher than 150 $ccH_2$/g is a=4.86~4.90 Å, while the optimum crystal lattice parameter c having the hydrogen absorption amount higher than 150 $ccH_2$/g at room temperature is c=7.95~8.02 Å. Accordingly, in the Ti-Mn-M alloys, the alloy with the crystal lattice parameters a=4.86~4.90 Å and c=7.95~8.02 Å respectively for the $MgZn_2$ Laves phase alloy has a hydrogen desorption amount higher than 150 $ccH_2$/g at room temperature, and is promising as a hydrogen storage material.

Subsequently, by way of example, crystal lattice parameters and representative properties obtained on ten samples A to J selected from the alloys according to the present invention will be shown in Table 1 below. In Table 1, the sample symbols A to J show specific examples for all of the seven elements V, Cr, Fe, Co, Ni, Cu and Mo as M of the Ti-Mn-M alloys of the present invention.

Table 1

| Sample symbols | Alloy composition (Atomic %) | | | Crystal lattice parameters (Å) | | Hydrogen absorption amount ($ccH_2$/g) | Hydrogen desorption amount ($ccH_2$/g) | Releasing ratio (%) | Plateau pressure (atm) |
|---|---|---|---|---|---|---|---|---|---|
| | Ti | Mn | M | a | c | | | | |
| A | 40.9 | 54.6 | V = 4.5 | 4.883 | 7.991 | 239 | 191 | 79.9 | 4~6 |
| B | 39.6 | 58.3 | V = 2.1 | 4.873 | 7.989 | 233 | 193 | 82.8 | 5~7 |
| C | 39.1 | 56.6 | Cr = 4.3 | 4.876 | 7.994 | 221 | 180 | 81.4 | 8~11 |
| D | 40.9 | 54.6 | Cr = 4.5 | 4.886 | 8.001 | 246 | 188 | 76.4 | 5~10 |
| E | 39.1 | 56.6 | Fe = 4.3 | 4.876 | 7.980 | 222 | 189 | 85.1 | 7~11 |
| F | 40.9 | 54.6 | Fe = 4.5 | 4.876 | 7.990 | 225 | 181 | 80.4 | 6~10 |

Table 1-continued

| Sample symbols | Alloy composition (Atomic %) | | | Crystal lattice parameters (Å) | | Hydrogen absorption amount (ccH₂/g) | Hydrogen desorption amount (ccH₂/g) | Releasing ratio (%) | Plateau pressure (atm) |
|---|---|---|---|---|---|---|---|---|---|
| | Ti | Mn | M | a | c | | | | |
| G | 39.1 | 56.6 | Co = 4.3 | 4.870 | 7.966 | 210 | 188 | 89.5 | 13~17 |
| H | 40.9 | 54.6 | Ni = 4.5 | 4.876 | 7.973 | 230 | 190 | 82.6 | 4~7 |
| I | 39.1 | 56.6 | Cu = 4.3 | 4.874 | 7.984 | 211 | 182 | 86.3 | 8~14 |
| J | 39.1 | 56.6 | M0 = 4.3 | 4.869 | 8.009 | 210 | 170 | 81.0 | 15~22 |

Remarks:
(1) The hydrogen absorption amount represents the amount of hydrogen absorbed per 1g of alloy upon application of pressure up to 40 atm at a temperature of 25° C.
(2) The hydrogen desorption amount represents the amount of hydrogen per 1g of alloy upon releasing of the hydrogen up to 1 atm at a temperature of 25° (3) The (3) The releasing ratio (%) is equal to (hydrogen desorption amount)/(hydrogen absorption amount) × 100.
(4) The plateau pressures are represented by values at a temperature of 25° C.

Figure 3:
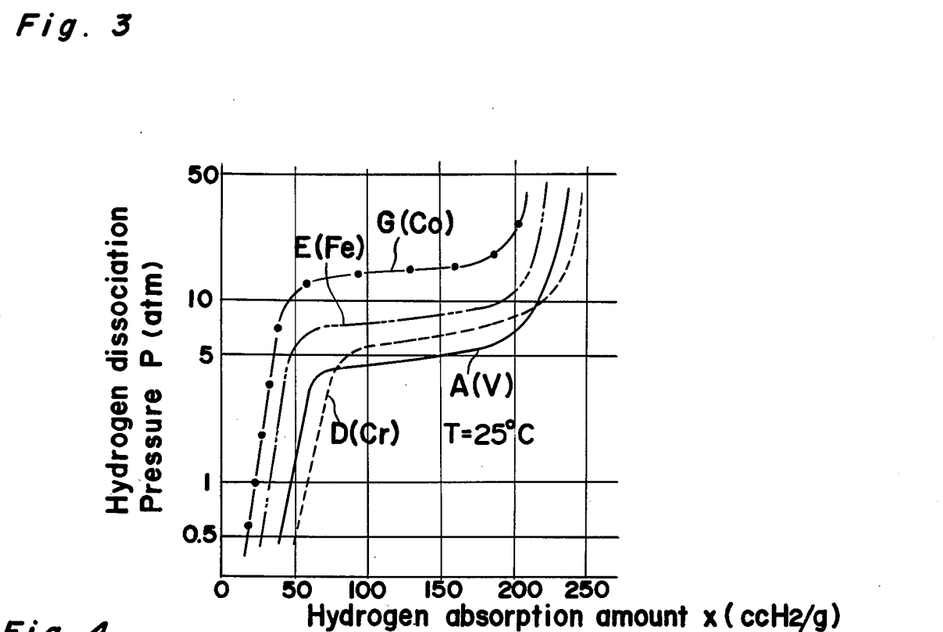
FIGS. 3 and 4 are diagrams showing hydrogen dissociation pressure-hydrogen absorption isotherms of the Ti-Mn-M alloy of the present invention at a temperature of 25° C.
Figure 4:
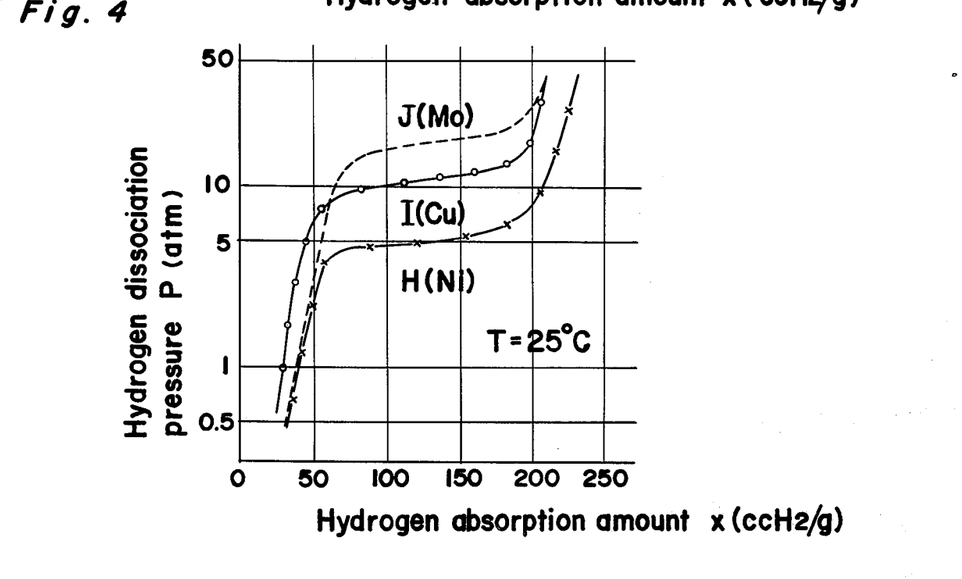

Furthermore, for illustrating the properties of the hydrogen storage material by the alloys according to the present invention, there are shown in FIGS. 3 and 4 hydrogen dissociation pressure-hydrogen absorption amount isothermic diagrams in which the hydrogen dissociation equilibrium pressures (P atm) are taken on the ordinate, while the hydrogen absorption amounts per 1 g of alloy (x ccH₂/g) are taken on the abscissa, with isothermic curves (T °C.) of the material (i.e. alloy) being further plotted therein. In these diagrams, the temperature (T °C.) is at 25° C. for each sample, and based on the sample symbols A to J shown in Table 1, the results of the samples A(M=V), D(M=Cr), E(M=Fe) and G(M=Co) are given in FIG. 3, while those of the samples H(M=Ni), I(M=Cu) and J(M=Mo) are plotted in FIG. 4.

Although the foregoing Table 1 and FIGS. 3 and 4 relate to the cases where M of each of the Ti-Mn-M alloys is composed of one kind of metal, it is to be noted that in the Ti-Mn-M alloys of the present invention, M is not limited only to one kind of metal, but may be more than two kinds of metal to provide a similar effect. In other words, according to a series of experiments carried out by the present inventors, it has been confirmed that even when M is of more than two kinds of metal selected from the seven elements V, Cr, Fe, Co, Ni, Cu and Mo, properties approximately similar to those shown in Table 1, and FIGS. 3 and 4 are available, if the alloy phase forms the single MgZn₂ Laves phase, with the crystal lattice parameters thereof controlled to have the optimum values mentioned earlier. For specific examples, Table 2 below shows properties represented by three samples K, L and M.

the predetermined pressure at each temperature is located in the pressure range generally horizontal with respect to the hydrogen absorption amount (x), i.e., the plateau pressure exists in the region of 4 to 22 atm at room temperature, not requiring heating during releasing of the hydrogen, with consequent marked superiority as the hydrogen storage metallic material.

Other advantages of the alloys according to the present invention are:

(1) In the alloy having the crystal lattice parameters adjusted to the optimum value, the amount of M of the Ti-Mn-M alloy is less than 10 atomic % approximately at the maximum, and even if M is of expensive V, Mo, etc., the material is low in cost as compared with the conventional hydrogen storage materials.

(2) The speeds during the hydrogen absorption and desorption or releasing are sufficiently high.

(3) The heat ($-\Delta H_f$) formed by reaction of the metal hydride has values in the vicinity of 6 to 8 kcal/molH₂, and the alloys of the invention are suitable for hydrogen storage purposes with small endothermic or heat absorption loss at hydrogen releasing due to the small values of the formed heat.

(4) The initial hydriding is extremely easy.

Meanwhile, it is needless to say that materials having various plateau pressures are necessary according to the purposes for use of hydrogen gas, and similarly, in cases where the hydrogen storage materials are used as heat accumulating materials or heat transportation medium utilizing the reaction heat generated at hydrogen absorption and desorption, a variety of plateau pressures are required according to the temperatures of the original heat sources.

Table 2

| Sample symbols | Alloy composition (Atomic %) | | Crystal lattice parameters (Å) | | Hydrogen absorption amount (ccH₂/g) | Hydrogen desorption amount (ccH₂/g) | Releasing ratio (%) | Plateau pressure (atm) |
|---|---|---|---|---|---|---|---|---|
| | | | a | c | | | | |
| K | Ti = 40.9<br>Cr = 2.3 | Mn = 54.6<br>Fe = 2.2 | 4.880 | 7.994 | 231 | 181 | 78.4 | 5~10 |
| L | Ti = 40.9<br>Ni = 2.3 | Mn = 54.6<br>Cu = 2.2 | 4.882 | 7.991 | 228 | 190 | 83.2 | 3~6 |
| M | Ti = 40.9<br>Ni = 2.2 | Mn = 54.6<br>Co = 2.3 | 4.878 | 7.974 | 227 | 186 | 82.0 | 4~7 |

Remarks:
(1) The hydrogen absorption amount represents the amount of hydrogen absorbed per 1g of alloy upon application of pressure up tp 40 atm at a temperature of 25° C.
(2) The hydrogen desorption amount represents the amount of hydrogen per 1g of alloy upon releasing of the hydrogen up to 1 atm at a temperature of 25° C.
(3) The releasing ratio (%) is equal to (hydrogen desorption mount)/(hydrogen absorption amount) × 100.
(4) The plateau pressure is represented by values at a temperature of 25° C.

From Table 1 and FIGS. 3 and 4, it is noticed that in the alloy according to the present invention, the hydrogen absorption amount and hydrogen desorption amount are comparatively large, and in addition, that Hereinbelow, the differences between the alloys of the present invention and the Ti-Mn binary alloy, Ti- Zr-Mn ternary alloy, and Ti-Zr-Mn-Cu and Ti-Zr-Mn-Mo quarternary alloys proposed by the present inventors in U.S. patent application Ser. No. 760,421 now U.S. Pat. No. 4,153,484, assigned to the same assignee will be described.

The optimum compositions for the Ti-Mn binary alloy referred to the above is TiMn$_{1.5}$, i.e., 40% of Ti and 60% of Mn in the atomic %, with the crystal lattice parameters of a≈4.88 Å and c≈7.98 Å, the hydrogen absorption amount of approximately 220 cc/g, hydrogen releasing ratio of 82%, hydrogen desorption amount of 180 cc/g, and plateau pressure of 7 to 8 atmospheric pressure at room temperature. Meanwhile, the practical composition range thereof is 39.0 to 41.0 at % Ti (59 to 61 at % Mn), and at the side where the amount Ti is small (i.e. the side which is smaller than 39 at % Ti), the properties (especially the hydrogen desorption amount) tend to be rapidly deteriorated even by slight variation in the amount of Ti, thus requiring particular attention during manufacture of the alloy.

In the Ti-Mn-M alloys according to the present invention, M is strictly limited to the predetermined elements, i.e., V, Cr, Fe, Co, Ni, Cu and Mo for obtaining the desired effects, and, for example, C, Si or Al, Zn and Sn, etc., although they belong to the same IV group as Ti in the periodic table, heavily deteriorate the properties of the Ti-Mn binary alloy if added thereto even by 1 at %, to such an extent that the alloy is rendered to be unsuitable for actual use. Additionally, the third element M is effective only in the limited range of its amount, which is approximately 2 to 5 at % as shown in Table 1. In the Ti-Mn-M alloy of the present invention, by adding a small amount (approximately 2 to 5 at %) of specific element as M to substitute for Mn, it has been made possible to expand the composition range of Ti and Mn to such an extent that was normally unsuited to the binary alloys. It is to be noted that the present invention has been achieved by finding out these specific seven elements for M, with further determination of the effective range of content of the seven elements. Meanwhile, the starting material for the Ti-Zr-Mn, Ti-Zr-Mn-Cu, and Ti-Zr-Mn-Mo alloys in which Zr is substituted for part of Ti is TiMn$_2$ having a Laves phase of hexagonal system MgZn$_2$ type, with the crystal lattice parameters a=4.82 Å and c=7.90 Å. The present inventors previously discovered, however, that these values for the lattice parameters are too small to absorb a large amount of hydrogen at room temperature, and thus, the alloy is not preferable as a hydrogen storage material. Accordingly, as a result of researches made to find out certain methods for increasing the values of the lattice parameters a and c of TiMn$_2$, it has been found that these values a and c can be made larger by substituting Zr belonging to the same IV and 6 group as Ti and totally subject to solid solution with Ti for part of Ti. Since it was preliminarily understood from the results obtained by the Ti-Mn binary alloy that the optimum lattice parameter range is a=4.83 to 5.00 Å and c=7.92 to 8.18 Å, the composition of Ti$_{0.5}$Zr$_{0.5}$Mn$_2$ has been determined to be optimum through adjustment of the amount for substitution by Zr to bring the values into the parameter range as described above.

Subsequently, further researches have been made by the present inventors into the quaternary alloys similarly based on TiMn$_2$ as in the above case for the reasons as follows.

(a) Even in the optimum Ti$_{0.5}$Zr$_{0.5}$Mn$_2$, although the hydrogen absorption amount is extremely large, the hydrogen releasing ratio is small, thus the total hydrogen desorption amount still being insufficient.

(b) Employment of expensive Zr should be reduced as far as possible.

As a result of the above researches for improving the hydrogen desorption amount, with reduction of Zr, the present inventors discovered alloys such as Ti$_{0.6}$Zr$_{0.4}$Mn$_{1.9}$Cu$_{0.1}$, Ti$_{0.7}$Zr$_{0.3}$Mn$_{1.9}$Mo$_{0.1}$, etc. However, since these alloys have TiMn$_2$ as the basic substance, Zr is indispensable to bring the lattice parameter values larger than those of TiMn$_2$, because hydrogen is not absorbed at all if Zr is removed in the above state. Therefore, as in the example for the quaternary alloys mentioned earlier, Zr in the region of 0.4/3 or 0.3/3 atm ratio is at least required.

As is seen from the foregoing description, on the basis of an extension of the above concept, it is impossible to constitute the Ti-Mn-M alloy for hydrogen storage as in the present invention with Zr removed therefrom.

It should be noted that the present invention is accomplished on the basis of a logic quite different from the logic mentioned above by employing TiMn$_{1.4}$ to TiMn$_{1.7}$ as the base which are apparently thought to form only heterogeneous composition instead of TiMn$_2$. In the course of the researches, the present inventors have found two essential points as follows which have directly contributed to the accomplishment of the present invention.

(i) Not only TiMn$_2$, but TiMn binary alloys in the range of TiMn$_{1.2}$ to TiMn$_2$ form hexagonal MgZn$_2$ type Laves phase having beautiful crystal structure.

(ii) Not only by the substitution of Ti of TiMn$_2$ for Zr, but by decreasing the amount of Mn with respect to Ti in the TiMn$_2$ composition, it is possible to increase the crystal lattice parameters a and c.

The hydrogen storage material according to the present invention has superior effects as follows without spoiling any of the properties of Ti-Mn binary alloys, Ti-Zr-Mn ternary alloys, and Ti-Zr-Mn-Cu and Ti-Zr-Mn-Mo alloys described earlier.

(i) The hydrogen amount (hydrogen desorption amount) available at room temperature has increased by about 10 cc.

(ii) It has been made possible to select the plateau pressures as desired in the range of 4 to 22 atmospheric pressure at room temperature.

(iii) The range for the optimum compounding compositions of Ti-Mn has been broadened.

As is understood from the foregoing description, the alloy according to the present invention has properties fully suited to practical application. In the Ti-Mn-M alloys of the present invention, not only the properties thereof are improved, but procedures required for manufacturing thereof have been significantly facilitated. More specifically, although the alloy phases effective as the hydrogen storage material for both of the Ti-Mn binary alloy and Ti-Mn-M alloy are an MgZn$_2$ type Laves phase, by forming multi-element alloys through further addition of at least one kind of the metals V, Cr, Fe, Co, Ni, Cu and Mo to Ti-Mn binary alloy as M, the crystallizing and homogeneous properties of the alloys have been improved. The above trend has been confirmed by the fact that improvement of the crystallizing and homogeneous properties of the MgZn$_2$ type Laves phase alloy due to formation into Ti-Mn-M alloy is clearly noticed as a result of investigations made into the crystallizing and homogeneous natures of the Ti-Mn binary alloy and Ti-Mn-M alloy obtained by arc melting, etc. through X-ray diffraction and the like. Therefore, in the process for making the alloy obtained by the arc melting homogeneous by heat-treatments, etc., it is possible to extremely relieve the conditions for the homogenizing heat-treatment of the Ti-Mn-M alloy which is inherently superior in the crystallizing and homogeneous properties for facilitating the manufacturing process.

One example for manufacturing the hydrogen storage metallic material according to the present invention is given below.

Ti, Mn and M having purity of about 99% are placed into a copper crucible for direct melting thereof by argon arc furnace. Through melting of several times at front and rear surfaces of Ti, Mn and M, considerably homogeneous Ti-Mn-M alloy in the shape of lead button can be obtained. By subsequently subjecting the resultant alloy thus obtained to a homogenizing heat-treatment for approximately 10 hours at a temperature of 1,100° C. in an atmosphere of argon, the lump of homogeneous alloy is obtained. The lump of the resultant alloy is comparatively brittle and readily crushable mechanically.

For hydriding, the lump of the resultant alloy crushed into several pieces is placed, for example, into a reaction vessel of stainless steel, with subsequent exhausting of air in the vessel by an oil rotary pump, etc. Thereafter, upon introduction of hydrogen gas having a purity of 99.9% into the reaction vessel up to approximately a pressure, of 20 atmospheres the alloy immediately starts absorbing hydrogen, and for the alloy of about 100 g in weight, the hydrogen absorption is completed within several minutes even at room temperature, with resultant formation of hydride of Ti-Mn-M alloy having particle diameter of several microns.

From the foregoing description, it is seen that the hydrogen storage material of the present invention constituted by the alloy represented by Ti-Mn-M (wherein M is at least one kind of metal selected from the group consisting of V, Cr, Fe, Co, Ni, Cu and Mo) which has $MgZn_2$ Laves phase, with the crystal lattice parameters $a=4.86$ to $4.90$ Å and $c=7.95$ to $8.02$ Å respectively is provided with features such as large hydrogen absorption amount and hydrogen desorption amount, and proper plateau pressure. Further the storage material has such advantages that the alloy can be produced at low cost, exhibits a fast reaction speed and small heat generation due to the reaction, and the initial hydriding is facilitated, etc. Moreover, the Ti-Mn-M alloy of the present invention, as described above, is further provided with an advantage that due to its improved crystallizing and homogeneous properties as compared with the Ti-Mn binary alloy, the manufacturing process therefor is appreciably facilitated.

Another feature of the Ti-Mn-M alloy of the present invention from the viewpoint of actual application is that the plateau pressure may be continuously adjusted approximately from 4 atm to 22 atm at room temperature through variations of composition (i.e., variation of elements for M and variation of the lattice parameters).

From the foregoing description, it is seen that the Ti-Mn-M alloy according to the present invention is extremely useful as a hydrogen storage metallic material.

Incidentally, there has conventionally been proposed, for example, in U.S. Pat. No. 3,922,872 J. J. Reilly et al., a hydrogen storage alloy represented by the general equation $TiFe_1-xMn_x$ (where $x=0.02$ to $0.5$). The known alloy with TiFe alloy as its base, however, has the crystal type either of cubic (cubic crystal) b.c.c. ($A_2$) type or cubic CsCl ($B_2$) type, and is quite different in the crystal type thereof from the hexagonal Laves phase $MgZn_2(C_{14})$ type of the alloys according to the present invention. Furthermore, in the conventional alloy represented by $TiFe_1-xMn_x$ (where $x=0.02$ to $0.5$) as described above, Fe content thereof is 1 to 49 times that of Mn, and is entirely different from the alloy of the present invention in the range of alloy structure.

In the known $TiFe_1-xMn_x$ (where $x=0.02$ to $0.5$) alloy, since part of Fe (50% at the maximum) is merely replaced by Mn, the hydrogen storage properties of TiFe can not be improved to a large extent without variation of the crystal shape noticed. On the contrary, the Ti-Mn-M alloy (wherein M is at least one kind of metal selected from the group consisting of V, Cr, Fe, Co, Ni, Cu and Mo) of the present invention with Ti-Mn alloy as its base has the hexagonal $MgZn_2$ crystal structure utterly different from the TiFe alloy, and thus, has made it possible to achieve the marked improvement in the properties.

Subsequently, description will be made on Ti-Mn-Fe alloy which is one of the Ti-Mn-M alloys according to the present invention.

In the known method of manufacturing generally employed Ti group hydrogen storage alloys such as Ti-Mn-Fe alloys having high melting points, composition raw material metals mixed at predetermined atomic ratio are placed, for example, in a porous alumina crucible for synthesization through direct melting in the crucible by means of a high frequency furnace or a high temperature resistance heating furnace. While the method as described above is economical with high working efficiency, since a large amount of material may be melted at one time, it has such disadvantages that the desirable alloy phase of a homogeneous nature is difficult to obtain due to the sticking of the molten alloy to the crucible as a result of reacting with the material of the crucible or due to soiling of the alloy by the influence of atmospheric gases in the furnace. Meanwhile, there has also been conventionally proposed a melting method utilizing an argon arc furnace for preventing soiling by the crucible or atmospheric gases, but such a known method is not suitable for melting a large amount of material, with consequent comparatively low working efficiency. Similar inconveniences as described in the foregoing are encountered also in the processing of the Ti-Mn-Fe alloy, and in the case where Ti is independently used as a raw material, the eroded crucible must be disposed of at each melting, while a homogeneous alloy of desired composition is difficult to obtain due to the soiling of the alloy or reaction thereof with the material of the crucible. Furthermore, Ti as a single material is comparatively high in cost, since it requires a relatively complicated refining process in the manufacture thereof. Accordingly, it is disadvantageous to employ the single metal of Ti for the manufacture of Ti alloy from the viewpoint of practical application and economy.

In the manufacturing method of the present invention, the single Ti and single Fe as the composition raw materials are replaced by the commercially available ferrotitanium to be melted in a homogeneous state in an inert gas atmosphere for eliminating the disadvantages in the conventional methods of the kind. In the above case, if for example, Ti which may be of an insufficient amount for obtaining an alloy of desired composition by the employment of ferrotitanium, such Ti may be supplemented by the addition of Ti metal.

Figure 5:
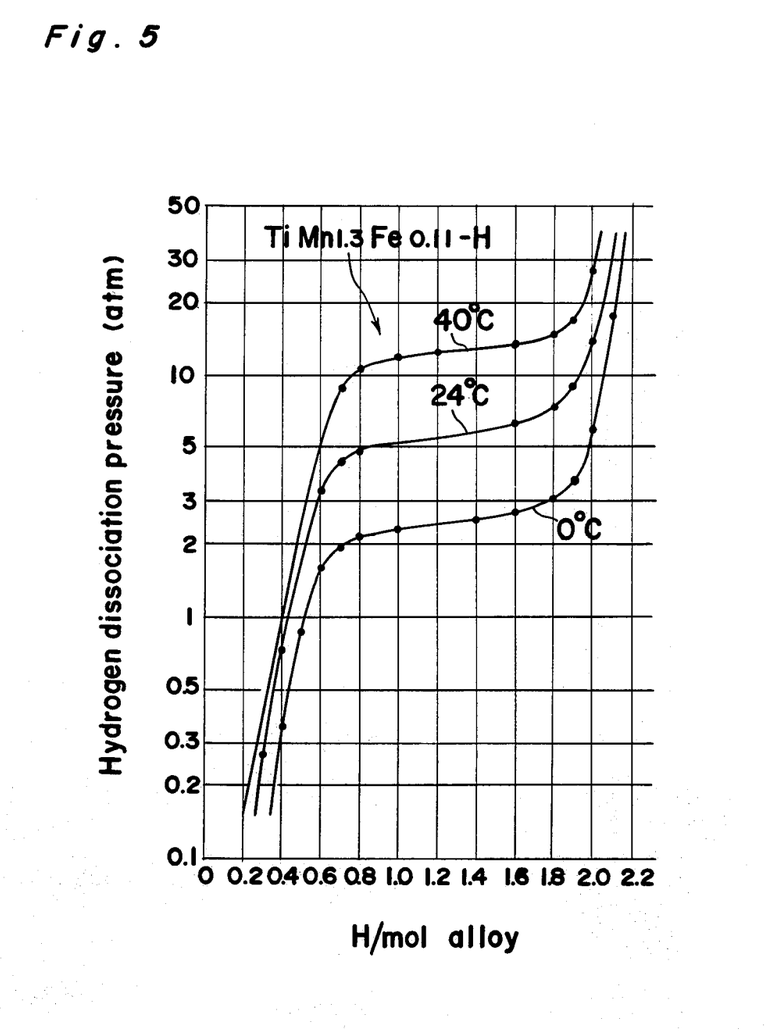
FIGS. 5 to 7 are diagrams showing hydrogen dissociation pressure-hydrogen absorption isotherms of $TiMn_{1.3}Fe_{0.11}$, $TiMn_{1.4}Fe_{0.11}$, and $TiMn_{1.2}Fe_{0.37}$ alloys as examples of the alloys produced according to the present invention.
Figure 6:
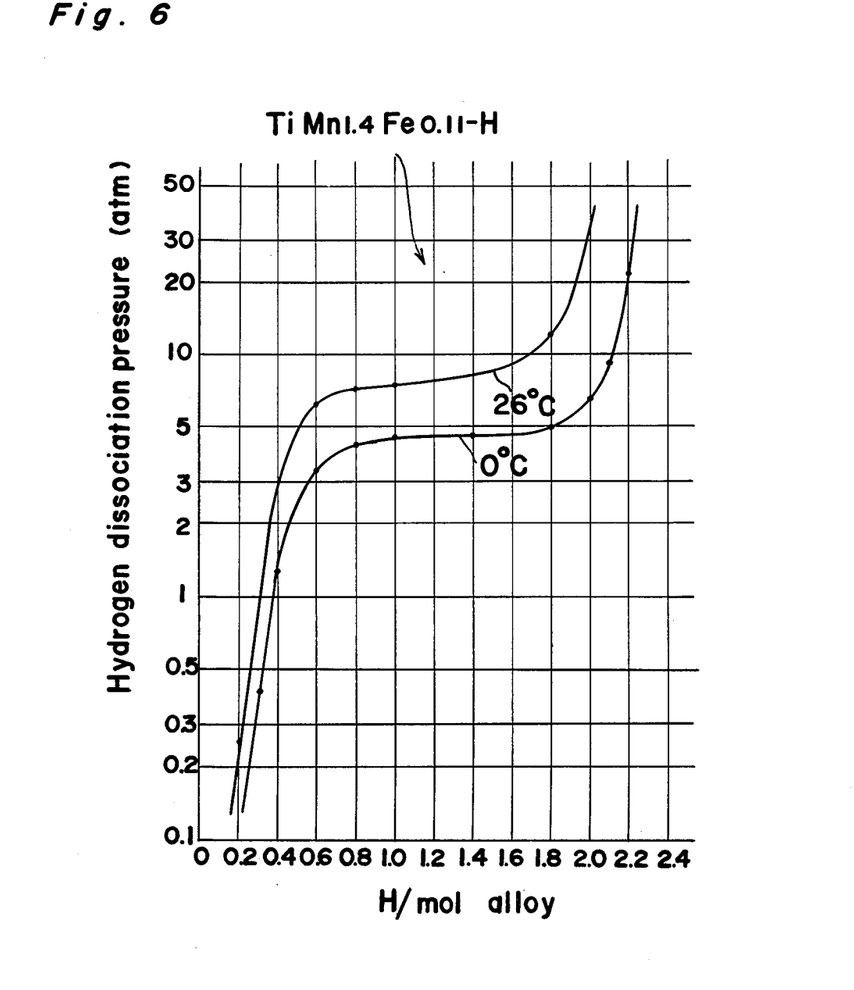
Figure 7:
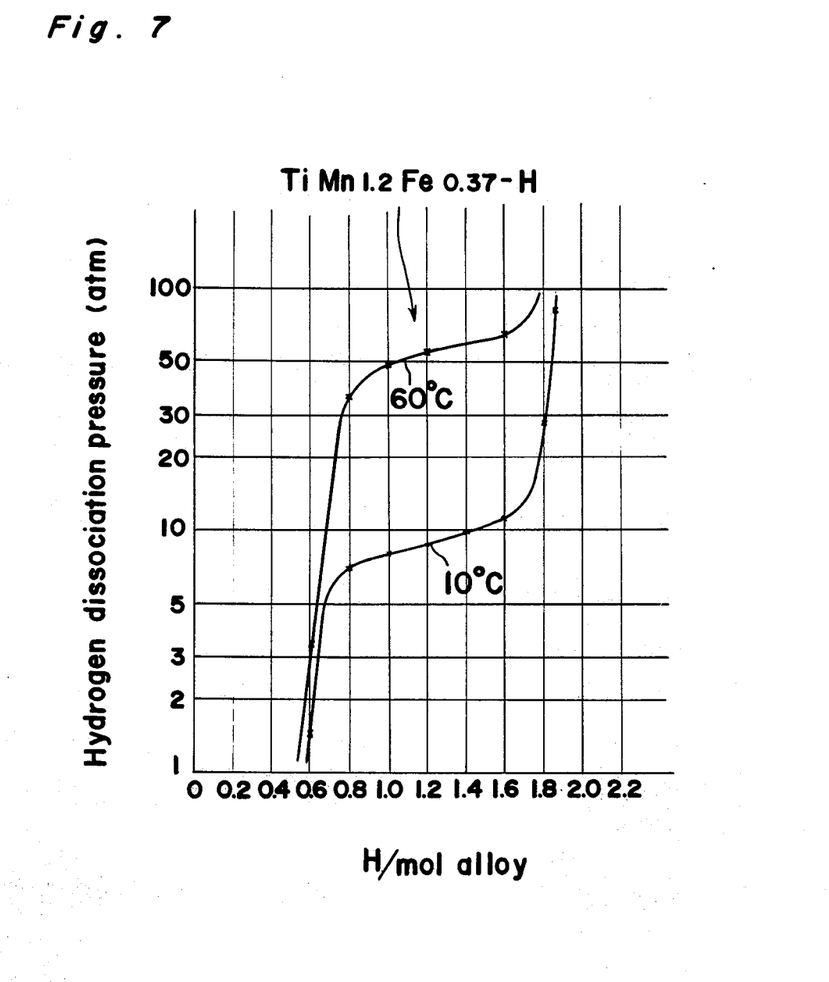

Referring to FIGS. 5 to 7 and also to Tables 3 and 4, the compositions and cost-wise ratio of the raw materials employed for effecting the present invention and the hydriding properties of the alloys produced by the employment of these raw materials will be described hereinbelow.

scribed above, while in FIGS. 5 to 7, the hydriding characteristics of the examples of Table 4 are illustrated in the hydrogen dissociation pressure-hydrogen absorption isotherms generally employed for representation. Moreover, the hydrogen storage properties of alloys manufactured in the conventional methods are also snown for comparison. In Table 4, the hydrogen absorption amount is represented by the maximum num- Table 3

| Classifications | Ti (%, minimum) | Fe (%, maximum) | Mn (%, maximum) | C (%, maximum) | Cost-wise ratio per unit weight |
|---|---|---|---|---|---|
| Titanium (sponge) | 99.8 | 0.03 | 0.002 | 0.01 | 1 |
| Titanium (sponge) | 99.5 | 0.1 | 0.01 | 0.03 | 0.71 |
| Titanium (sponge) | 99.0 | 0.5 | 0.03 | 0.05 | 0.57 |
| Ferrotitanium (OFT-70) | 70.0 | 29.3 | 0.2 | 0.1 | 0.31 |
| Ferrotitanium (OFT-40) | 40.0 | 59.2 | 0.3 | 0.1 | 0.28 |

In the above Table 3, the compositions and prices of the titanium single metals and ferrotitanium alloys used for the hydrogen storage Ti-Mn-Fe alloys as raw materials are tabulated for comparison. As is seen from Table 3, the single titanium metal is approximately 3 times higher in price per unit weight than the ferrotitanium alloy. In the conventional manufacturing method of Ti-Mn-Fe alloys, the material is prepared by the addition of electrolytic manganese and electrolytic iron or common manganese of comparatively high purity and iron to the expensive titanium to achieve a desired mixing ratio for production of the alloy. Therefore, in addition to the disadvantage in the cost of the raw material, the manufacturing process is complicated, while the problems related to the reaction of the single titanium with the crucible and the heterogeneous nature of the resultant alloy as described earlier undesirably take place. In the present invention, the inconveniences as described above have been eliminated by the employment of the ferrotitanium as shown in Table 3.

For the manufacturing of the alloys of the present invention employing the ferrotitanium as raw material, exactly the same procedures as in the conventional melting methods utilizing the high frequency furnace, arc furnace, etc. may be employed, and the resultant alloy thus obtained is superior in its homogeneous nature to conventional alloys, with less deviation in the quality from lot to lot during manufacture, thus presenting the hydrogen storage material having favorable storage properties.

In Table 4, there are shown the hydriding characteristics of typical examples for Ti-Mn-Fe alloys employing ferrotitanium and synthesized in the manner as deber of atoms per one alloy molecule absorbed when hydrogen is subjected to 50 atmospheres pressure at predetermined temperatures, or by the hydrogen amount (cc) absorbed into 1 g of the alloy and converted into the value at a temperature of 20° C. Meanwhile, the hydrogen desorption amount is represented by the hydrogen amount (cc) per 1 g of the alloy when the absorbed hydrogen is released under atmospheric pressure at an ambient temperature of 20° C. It is to be noted that in the examples of Table 4, the ferrotitanium (OFT-70) of Table 3 is employed for Ti and Fe, with the insufficiency of the Ti being supplemented by the addition of the pure Ti metal.

Table 4

| Alloy compositions | Temp. (°C.) | Hydrogen absorption amount | | Initial releasing ratio (%) | Hydrogen desorption amount cc(20° C.) Alloy 1g | Crystal lattice parameters | |
|---|---|---|---|---|---|---|---|
| | | No. of hydrogen atoms Alloy 1mol | cc(20° C.) Alloy 1g | | | a(Å) | c(Å) |
| TiMn$_{1.3}$Fe$_{0.11}$ | 0 | 2.16 | 230 | 76 | 176 | | |
| | 24 | 2.11 | 224 | 80 | 179 | 4.876 | 7.990 |
| | 40 | 2.05 | 218 | 81 | 175 | | |
| TiMn$_{1.4}$Fe$_{0.11}$ | 0 | 2.25 | 229 | 84 | 193 | 4.876 | 7.980 |
| | 26 | 1.80 | 219 | 86 | 189 | | |
| TiMn$_{1.2}$Fe$_{0.37}$ | 10 | 1.83 | 164 | 59 | 96 | | |
| | 20 | 1.49 | 161 | 72 | 116 | — | — |
| | 60 | 0.88 | 156 | 71 | 112 | | |

It is noticed from Table 3 that ferrotitanium contains a comparatively large amount of carbon C which adversely affects the hydrogen storage properties as compared with pure titanium. However, as shown in Table 4, the hydrogen storage properties of the alloys employing ferrotitanium are favorable in each of the alloys, with the hydrogen absorption amount of more than 150 cc/g at room temperature, released hydrogen in an amount above 110 cc/g, while the plateau characteristics of the hydrogen dissociation pressure therefore are generally good as shown in FIGS. 5, 6 and 7, and thus the alloys of Table 3 show superior characteristics approximately equal to those produced by the conventional methods. From the above findings, it is considered that there is almost no deterioration in the characteristics for practical use even if the Ti and Fe are replaced by ferrotitanium.

As is clear from the foregoing description, in the manufacturing method of the hydrogen storage material according to the present invention, favorable effects as follows can be achieved.

(1) The prices of the produced alloys are reduced owing to the low cost of the raw materials.

(2) Since the undesirable reaction of the alloy with the materials of the crucible is eliminated, homogeneous alloys of desired composition may be produced, with marked reduction of consumption and expenditure of crucibles.

(3) As compared with the known method in which each of the composite metallic raw materials is weighed for mixing, one operating procedure is omitted, with consequent simplification of the manufacturing process and reduction in the production cost.

(4) Since ferrotitanium is almost uniform in composition, deviations in the quality of the alloys between manufacturing lots can be minimized, and thus deviations in the hydrogen storage characteristics can consequently be reduced.

Although the present invention has been fully described by way of examples with reference to the attached drawings, it is to be noted that various changes and modifications are apparent to those skilled in the art. Therefore, unless such changes and modifications depart from the scope of the present invention, they should be construed as being included therein.

What is claimed is:

1. A metallic material for storing of hydrogen which comprises a substance able to store hydrogen and composed of a Ti-Mn-M alloy defining an alloy phase which is substantially a Laves phase constituted by an intermetallic compound, which has a hexagonal crystal structure of the $MgZn_2(C_{14})$ type, and crystal structure parameters a and c which have values in the ranges:
$a = 4.86 \sim 4.90$ Å
$c = 7.95 \sim 8.02$ Å
said M of said Ti-Mn-M alloy representing at least one metal selected from the group consisting of vanadium, chromium, iron, cobalt, nickel, copper and molybdenum.

2. A metallic material as claimed in claim 1, wherein said M of said Ti-Mn-M alloy represents iron.

3. A metallic material as claimed in claim 1, wherein said Ti-Mn-M alloy is prepared through synthesization by homogeneously melting at least ferrotitanium and manganese as raw material in an atmosphere of inert gas.

4. A hydride formed by causing hydrogen to be absorbed into a metallic material which comprises a substance able to store hydrogen and composed of a Ti-Mn-M alloy defining an alloy phase which is substantially a Laves phase constituted by an intermetallic compound, which has a hexagonal crystal structure of the $MgZn_2(C_{14})$ type, and crystal structure parameters a and c which have values in the ranges:
$a = 4.86 \sim 4.90$ Å
$c = 7.95 \sim 8.02$ Å
said M of said Ti-Mn-M alloy representing at least one metal selected from the group consisting of vanadium, chromium, iron, cobalt, nickel, copper and molybdenum.

5. A method of storing, transporting and preserving hydrogen comprising the steps of preparing a metallic material able to store hydrogen and composed of a Ti-Mn and M alloy defining an alloy phase which is substantially a Laves phase constituted by an intermetallic compound, which has a hexagonal crystal structure of the $MgZn_2(C_{14})$ type, and crystal structure parameters a and c which have values in the ranges:
$a = 4.86 \sim 4.90$ Å
$c = 7.95 \sim 8.02$ Å,
and forming said Ti-Mn and M alloy into a hydride by causing hydrogen to be absorbed thereinto, said M of said Ti-Mn-M alloy representing at least one metal selected from the group consisting of vanadium, chromium, iron, cobalt, nickel, copper and molybdenum.

6. A method as claimed in claim 5, wherein said M of said Ti-Mn-M alloy represents iron.

7. A method as claimed in claim 6, wherein said Ti-Mn-M alloy is prepared through synthesization by homogeneously melting at least ferrotitanium and manganese as raw materials in an atmosphere of inert gas.

* * * * *